Aug. 9, 1938.   W. W. CRILEY ET AL   2,126,453
APPARATUS FOR FORMING BLANKS FROM HOT ROLLED WIRE STOCK
Filed Sept. 14, 1936   7 Sheets-Sheet 1
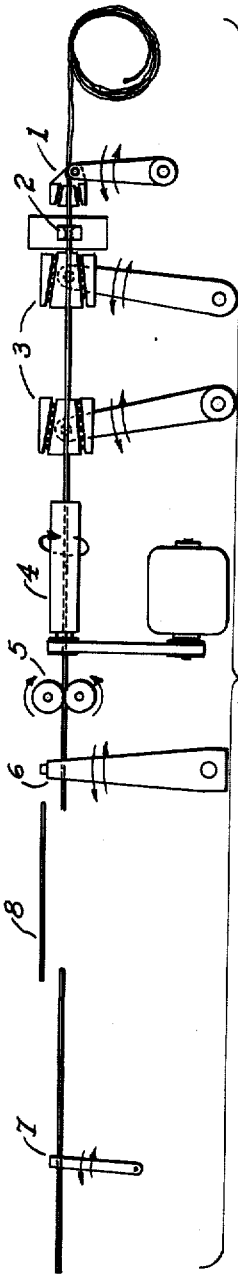
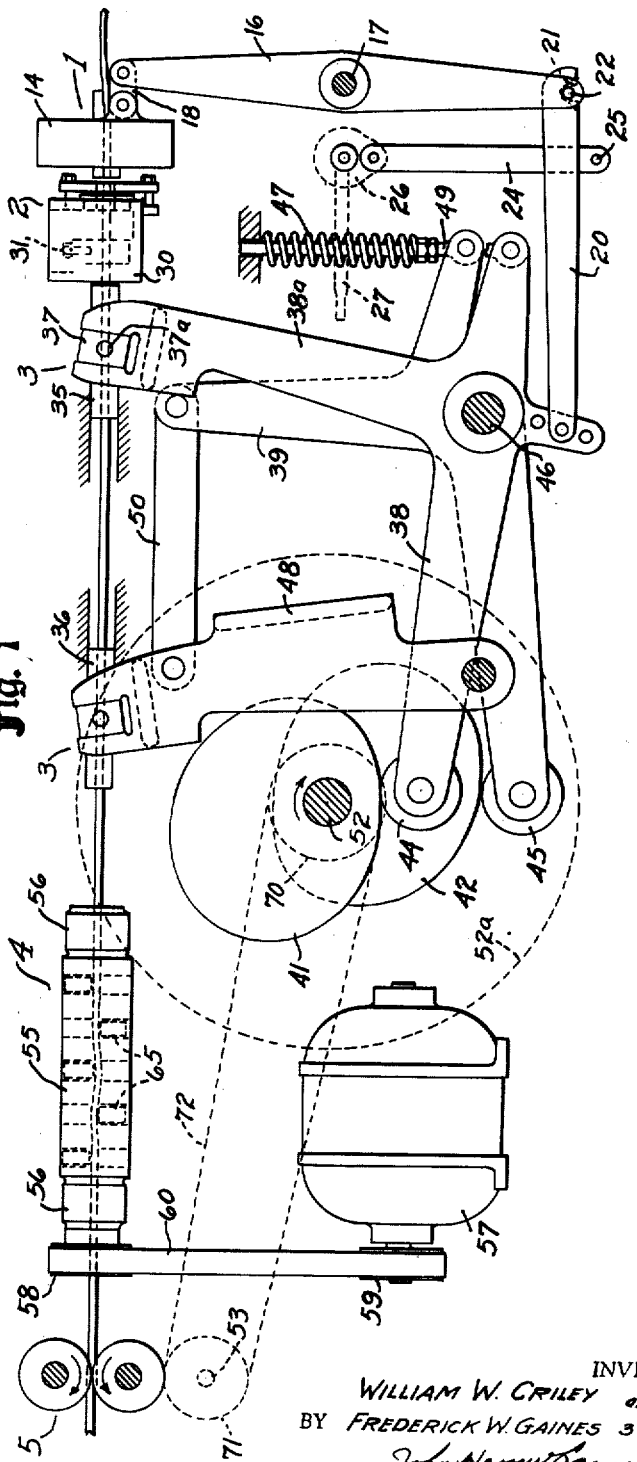
INVENTORS
WILLIAM W. CRILEY and
BY FREDERICK W. GAINES 3rd
John Harvey Leonard
their ATTORNEY.

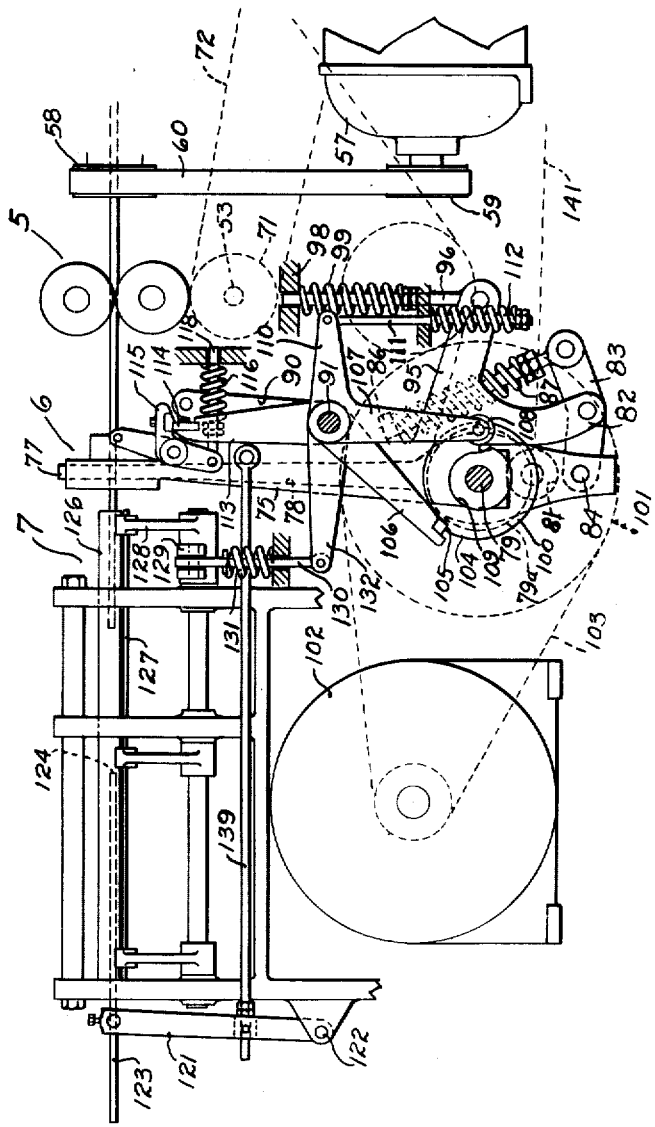

Aug. 9, 1938.  W. W. CRILEY ET AL  2,126,453
APPARATUS FOR FORMING BLANKS FROM HOT ROLLED WIRE STOCK
Filed Sept. 14, 1936  7 Sheets-Sheet 7

INVENTORS
WILLIAM W CRILEY and
FREDERICK W GAINES 3rd
BY
ATTORNEY.

Patented Aug. 9, 1938

2,126,453

UNITED STATES PATENT OFFICE 2,126,453

APPARATUS FOR FORMING BLANKS FROM HOT ROLLED WIRE STOCK

William W. Criley and Frederick W. Gaines, 3rd Cleveland, Ohio

Application September 14, 1936, Serial No. 100,616

18 Claims. (Cl. 29—34)

This invention relates generally to an apparatus for producing blanks from wire or rod stock which has been produced by the hot forming methods, and particularly to an apparatus for drawing to gauge, straightening, and cutting to proper length, the wire or rod stock, during continuous travel of the stock through the apparatus.

Heretofore, in the production of blanks from hot produced stock, the practice has been to draw the stock from commercial coils through reducing dies, and to recoil the same, in one machine, and, after a lapse of time, to place the coils in a different apparatus by which the drawn stock is uncoiled, pulled through a straightening mechanism and thereby straightened, and then cut to length. This prior practice requires separate machines and operators for each.

The dies in prior wire drawing machines are purposely offset or tilted with respect to the axis of the drawn wire in order to facilitate the recoiling of the wire after drawing. Such a die, in reducing the wire to the desired cross section, bends the wire axially to the desired coil diameter.

The tensile strength of cold drawn wire increases several thousand pounds per square inch within twenty-four hours after drawing; this increase doubles within the next few days, and, after several months, increases an additional several thousand pounds. Concurrently, this increase in tensile strength is accompanied by a decrease in ductility and an increase in hardness. The yield point of the stock, therefore, is at its lowest magnitude immediately after the drawing operation. If a lapse of time is permitted to occur between the drawing and final finishing of the stock, additional drawing is difficult to effect without annealing and consequently several gauges of drawn stock must be kept available for the production of different sized blanks.

Also, due to these increases in the tensile strength and hardness, and the decrease in ductility of the cold drawn wire or rods occurring as a result of a lapse of time after the drawing operation, a considerable amount of power is not only wasted in the straightening and cutting machine under the prior practise, but also is converted into damaging heat and wear, scoring of the equipment and the finished blanks with resultant direct losses due to the damaged blanks, wear of the apparatus, and time consumed while the machine is idle for changing the worn or damaged tool parts.

One of the principal objects of the present invention, therefore, is to produce blanks from unheated stock of this character by the steps of pulling the stock through suitable dies, directly from the commercial coil, to reduce it to drawn wire of the gauge desired, then pushing the drawn wire through a suitable rotary straightening mechanism immediately after its reduction and without any delay, so as to relieve the wire and straightener from stresses and wear resulting from passing the wire through the straightener after the wire has become additionally hardened by aging, and thereafter immediately cutting the wire to the desired lengths, and removing the wire blanks from the path of the oncoming wire during continuous travel of the wire or stock.

More specific objects are to reduce the stresses in the wire during the formation thereof by pulling the wire through a drawing die, the central axis of which substantially coincides with the axis of the drawn wire, and concurrently pushing, instead of pulling, it through the rotary straightener, so as to reduce the power required for passing the wire through the rotary straightener and die and also to relieve the wire and die and straightening mechanism from heavy stresses, scoring and wear, all of which inherently occur when the wire is pulled through both from a point beyond the straightener.

Another object is to provide an apparatus of this character which is continuous in its operation, which requires but a single operator, and in which a uniform rate of continuous travel of the wire through the apparatus is effected.

Another specific object is to provide an apparatus having a rotary straightener and flying shear with a feeding means between the rotary straightener and the flying shear such that the final length of the stock may be fed automatically and entirely through the apparatus.

Another object is to provide a flying cut-off and an instantaneous clutch and trigger mechanism cooperating therewith, wherein the combination is so arranged that inertia forces accompanying the operation thereof are small, and increased ease and speed in operation are assured, whereby constant and extremely close precision in the lengths of the final blanks, compared to other flying cut-off devices, is effected.

Another specific object is to provide a new cut-off gauge cooperating with the flying cut-off for automatically controlling the length of the resultant blanks while permitting rapid removal of the cut blanks from the path of the oncoming wire.

Further specific objects include the provision of a combination wire drawing, straightening and cut-off machine which occupies less floor space than the total floor space now required by separate machines, one machine for the drawing operation and another machine for the straightening and shearing operation, and which furthermore eliminates the labor in handling and transporting the stock.

Other objects and advantages will become apparent from the following specification wherein reference is made to the drawings in which:

Fig. 1 is a somewhat diagrammatic illustration of the operating mechanism illustrating the path of the wire from the initial coil of hot rolled stock to the finished blanks and the operations performed thereon during the passage thereof along such path;

Figs. 2 and 3 are side elevations, respectively, of adjacent portions of the complete apparatus showing the broad cooperative relationships among the operating parts;

Figure 4:
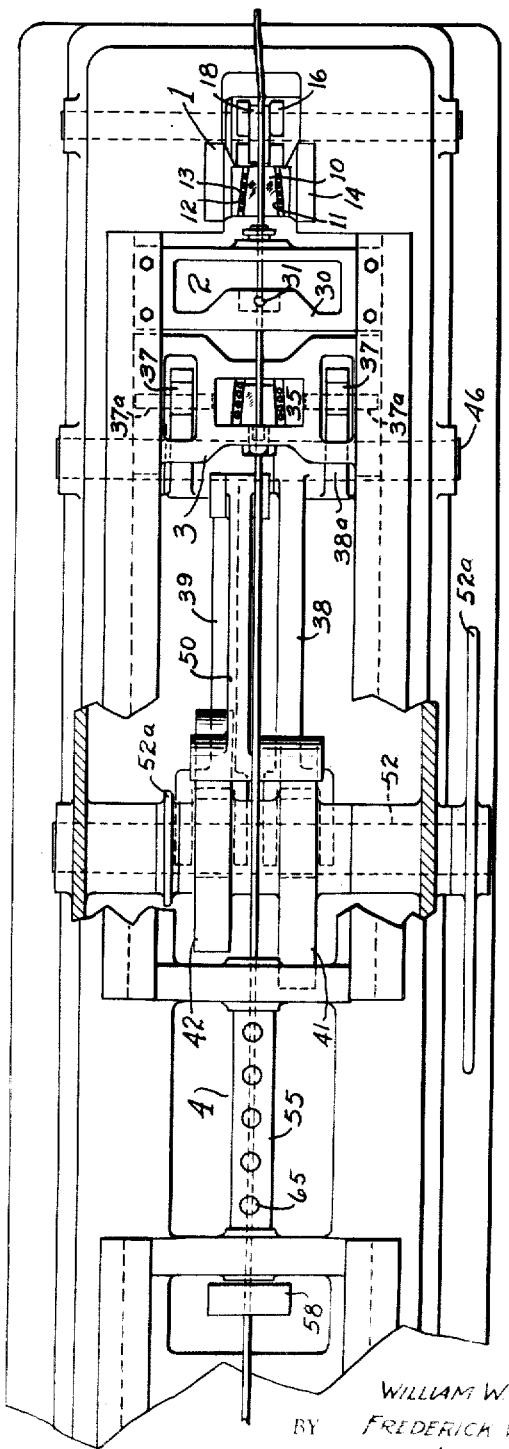
Figs. 4 and 5 are top plan views respectively, of the portions of the apparatus shown in Figs. 2 and 3.
Figure 5:
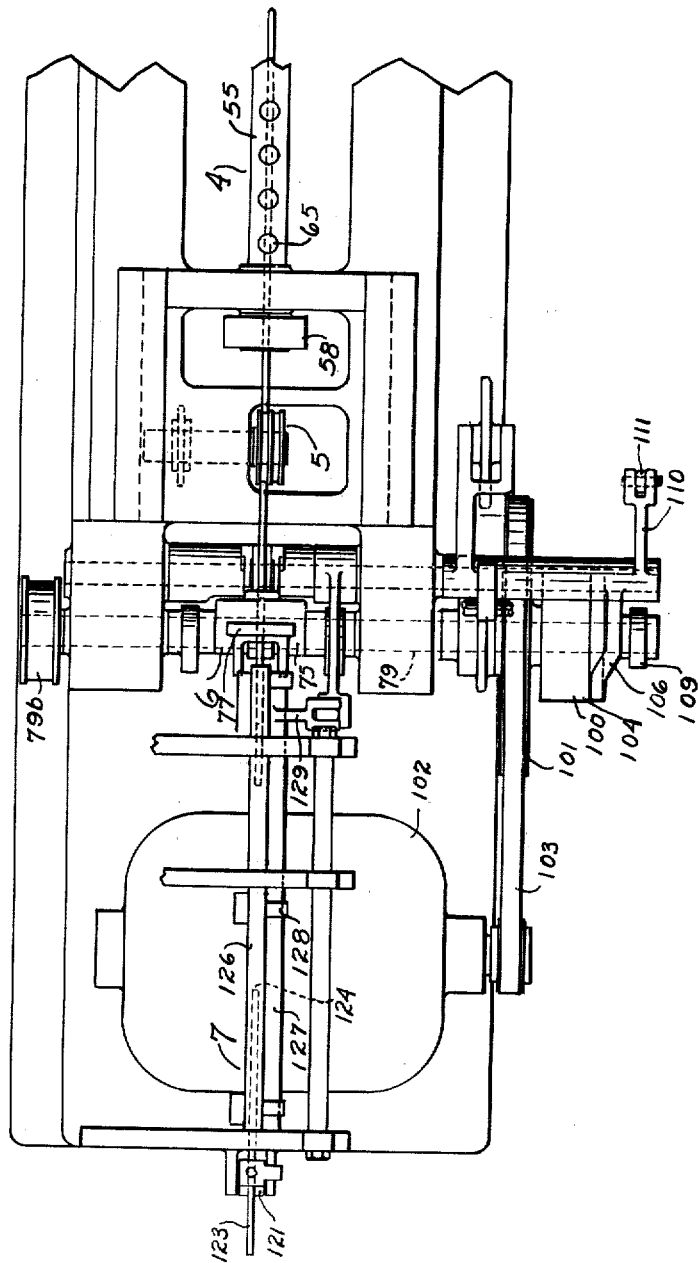

A preferred embodiment of the present invention is diagrammatically illustrated in Fig. 1 and broadly comprises, in the order of operation, a short stroke stock starting mechanism 1 which is preferably rendered operable only for the period required to start and initially force the wire through a stationary drawing die 2. After the wire is thus started, it is gripped by a positive feeding mechanism 3, having reciprocating grippers which alternately grip and release the wire to produce continuous uniform tension on the wire and thus cause the wire to travel through the drawing die 2 at a constant rate of speed and to pass into a rotary straightener 4 through and beyond which the wire is pushed by the feeding mechanism 3. Beyond the straightener 4, the wire, after passing through driven feed rolls 5 which are driven in synchronous relation to the wire, passes into a flying shear mechanism 6 controlled by an adjustable gauging device 7, the gauging device being operated by an abutment engageable by the traveling stock to initiate operation of the flying shear for cutting the wire into blanks 8 of the desired length, the gauging device being operable to facilitate discharge of the blanks.

Referring in detail to the cooperating parts of the apparatus, the construction and operation of the short stroke stock starting mechanism 1 is illustrated in Figs. 2 and 4, and includes a pair of gripping blocks 10 arranged to be wedged relatively together into firm gripping relation to the stock. For effecting the gripping action, each block 10 has wedge surfaces 11 cooperating through anti-friction rollers 12 with complementary wedge surfaces 13 in a reciprocable housing 14 which is constrained to travel in a straight path parallel to the path of travel of the wire or stock. Means are provided to reciprocate the housing 14, together with the wedge blocks 10, to and fro along the path of travel of the wire. The wedges coact to cause the gripping blocks 10 to grip the stock when the housing moves in the direction of travel toward the die 2 and push the stock, by successive operations, into the reducing die 2. During the reverse movement of the housing 14, the gripping blocks are released by the wedge surfaces and thereupon release their engagement with the stock. Thus, for the brief interval, during which the stock is being introduced into the drawing die, the stock is moved intermittently.

The housing 14 may be reciprocated in any convenient manner such, for example, as by an oscillating lever 16 pivoted near its center on a shaft 17, one end of the lever 16 being connected to the housing 14 through a shackle 18. For oscillating the lever, the other end of the lever is connected to a power driven reciprocating push rod 20. In order to render the lever idle when desired, the free end of the push rod 20 may be detachably connected to the lever 16 by means of a notch 21 which receives a pin 22, rigid with the lever 16, so that the rod can be lifted out of engagement with the pin 22. For lifting the push rod 20 so that the notch 21 is free from the pin 22, a lift rod 24, having a pin 25 projecting from the lower end thereof and lying beneath the lower edge of the push rod 20, is provided. If desired, the upper end of the lift rod 24 may be secured to a crank 26 rotatably mounted on the frame of the machine and rotatable through 180° by means of a lever 27 to cause the desired vertical movement of the lift rod 24 and concurrent movement of the push rod 20, so that the notch 21 is withdrawn from engagement with the pin 22.

The stationary drawing die 2 is preferably rigidly fixed in a housing 30 and is so positioned that the central axis thereof substantially coincides with the path of travel of the wire through the die. The die is preferably removably secured therein by means of a set screw 31, the housing 30 being provided with a recess in which a lubricant, such as aluminum palmitate, may be received and continuously applied to the stock as it is being drawn through the die.

Immediately beyond the drawing die is the positive wire feeding mechanism 3 which includes a plurality of wire grippers. In the form illustrated, a pair of grippers 35 and 36 are provided. The grippers 35 and 36 are preferably similar in construction and in the gripping operation to the gripping blocks 10 of the short stroke stock starting mechanism 1. In order to effect continuous and uniform travel of the wire, the grippers 35 and 36 drive the wire successively in an overlapping timed relation so that at least one gripper is driving the wire at all times.

For this purpose, the grippers may be reciprocated alternately toward and away from each other with uniform rectilinear motion respectively, each gripper gripping and driving the wire prior to the release and return of the other. To operate the grippers 35 and 36, a bell crank 38 having spaced parallel arms 38a, and a rocking link 48 comprising similarly spaced parallel arms, later to be described, are provided. The grippers 35 and 36 are carried on the bell crank and rocking link, respectively, the rocking axes of both the bell crank and link extending transversely of the path of travel of the wire and being spaced therefrom. Therefore, if the grippers were secured in fixed position on the associated bell crank and link, they would travel in an arcuate path instead of a lineal path. In order to effect lineal travel of the grippers, each is mounted in its associated crank or link for limited bodily movement radially with respect to the rocking axis thereof and also for limited rocking movement about an axis parallel to the rocking axis. Since both the grippers operate in a corresponding manner, the gripper 35 only will be specifically referred to.

Referring to the Figs. 2 and 4, it will be noted that the gripper 35 comprises separable clamping elements operably mounted in a housing which is pivotally secured on both sides to spaced slide members 37, slidably mounted in the ends of the arms 38a. These slide members 37 are carried on pins 37a, the axes of which at all times intersect the axis of the traveling wire and extend at right angles thereto. The slide members 37 also are mounted for sliding movement radially of the rocking axis of the bell crank 38 relative to the bell crank arms 38a. A suitable horizontal slide, as illustrated in Fig. 2 is provided in the frame of the apparatus for guiding the gripper 35 along the proper lineal path parallel to the path of travel of the wire. The gripper 36 is correspondingly mounted.

Thus it will be seen that the grippers 35 and 36 are free to move bodily radially of their rocking axes relative to their respective arms 38a and 48 and also to rock relative thereto concurrently, so as to remain in a lineal path of travel in all positions of movement of the arms 38a and 48.

Since both sides of the housing of the gripper 35 are simultaneously actuated by the spaced arms 38a through the medium of the pins 37a, and since the axes of the pins 37a are constrained to move in a path coincident with the axis of the path of travel of the wire, it follows that the gripper 35 exerts only a lineal force on the wire. In this construction there is no lateral eccentricity between the line of force on the gripper and the axis of support of the gripper and consequently there is no tendency for the grippers to cock in their mounting and bend the wire during the drawing stroke.

To operate the grippers 35 and 36, bell cranks 38 and 39, actuated by suitable cams 41 and 42, respectively, are provided. Cam followers 44 and 45 respectively may be provided on the bell cranks and comprise anti-friction rollers mounted on the ends of the respective bell cranks. The followers 44 and 45 engage the cams 41 and 42, respectively. These bell cranks are shown mounted on a common shaft 46 which is preferably secured to the frame of the machine.

For resiliently holding the cam followers 44 and 45 in pressure engagement with the cams 41 and 42 respectively, compression springs 47 are provided. The springs 47 surround suitable eye bolts 49 each of which is pivotally secured to a suitable extension on the associated bell crank 38 or 39 as shown in Fig. 2. These springs react between stationary lugs on the frame and suitable abutments on the eye bolts, thus causing normal downward pressure on the extensions and consequent upward pressure of the roll followers 44 and 45 on the cams 41 and 42 respectively. The springs 47 also act to return the grippers 35 and 36 on the idle or return stroke.

The gripper 35 is actuated directly by the bell crank 38 and since the two wire grippers are spaced longitudinally of the path of the traveling wire, the gripper 36, which is spaced longitudinally of the path of travel from a common shaft 46, must be actuated by a link 48, provision being made for operating the link 48 by a connecting rod 50 secured at one end to the bell crank 39 and at the other end to the link 48.

It should be noted that the cams 41 and 42 are substantially identical in shape and size and are angularly disposed with respect to each other on a common shaft 52. The cams are so shaped and spaced angularly about their axis of rotation that the wire gripping and driving portions of the cycle of one overlaps, slightly, the corresponding portion of the cycle of the other. With the particular shape of cams shown for illustration, the cams are preferably offset circumferentially of the shaft through an angle of about 180° and the portion of each cam for effecting the wire driving operation is over 180° in extent. The cam surface and bell cranks are designed to effect progressively changing speed of travel of the cranks as they pass along different portions of their path of movement so as to compensate for the difference in radial distance of the associated grippers with respect to the rocking axis of the bell crank and thereby effect uniform lineal travel of the grippers 35 and 36. This relation is such also that when the gripper 35 has reached the end of its path of movement in the direction opposite to the direction of travel of the wire, as shown in Fig. 2, the gripper 36 has substantially completed its wire driving movement in the direction of travel of the wire. As the gripper 35 moves in the direction of travel of the wire, it immediately effects gripping action on the wire during its movement and slightly before the gripper 36 has released the wire and started on its idle movement to the right. Conversely, when the gripper 35 has reached its extreme left-hand position, the gripper 36 has returned to its extreme right-hand position and partially moved in wire driving direction therefrom, the gripper 35 is caused to release the wire. Thus, it will be seen that in effect, a hand over hand application of pulling force is applied to the wire in a manner such that uniform and continuous movement is imparted to the wire.

As the wire passes from the grippers 35 and 36, it is pushed thereby through the rotary straightener 4. The straightener 4 comprises a narrow, elongated, horizontally disposed housing 55 having a longitudinal passage through which the wire is pushed by the wire grippers. The housing 55 is mounted in suitable bearings 56 on the frame of the apparatus for rotation about its longitudinal axis and is preferably driven by a separate motor 57 through the medium of pulleys 58 and 59 connected by a belt 60. Mounted in the housing 55 and directed radially inwardly thereof are a plurality of straightening tools 65 which are adjustable radially from the exterior of the housing 55 and are spaced longitudinally of the housing with respect to each other. Adjacent tools 65 lie diametrically opposite with respect to the wire and the inner ends thereof are positioned to extend slightly beyond the axis of rotation of the housing 55. This produces a serpentine path for the wire longitudinally of its path of travel. The passage along this path together with the concurrent rotation of the housing 55 with tools 65 around the wire straightens the wire as it is passed through the housing 55.

As mentioned in the objects hereof, the wire passes from the drawing die 2 and immediately enters into and passes through the rotary straightener 4, and therefore the drawn wire passes through the rotary straightener before the hardness is increased and the ductility decreased due to a lapse of time after drawing. In this condition, the amount of power required from the motor 57 to rotate the rotary straightener is at a minimum. Since in straightening wire, the magnitude of the staggered relations of the tools 65 must be increased as the hardness of the wire increases, a considerable elapsed time between the drawing operation and the straightening operation, as in prior practice, necessitates a greater magnitude of the staggered relation of the tools 65 and, therefore, more power for effecting the straightening operation.

Consequently, as a result of the immediate passage of the wire from the die 2 to the straightener 4, the wire is subjected to the straightening operation under the most favorable conditions therefor both as to inherent workability of the wire and as to the magnitude of the stagger of the tools 65. Thus this single change in practice effects great economies in power, maintenance, and operating time, increases the useful life of the apparatus, and reduces the number of damaged and scarfed blanks.

Due to positioning of the feeding mechanism 3 in advance of the straightener 4 along the path of travel of the wire, the wire is pushed through the straightener instead of being pulled therethrough in the customary manner. This effects a further saving in the power required for straightening the wire and reduces the stresses on the wire and straightening mechanism, as the wire is free to give and relieve the binding pressure on the tools 65 with a consequent reduction in frictional resistance, whereas drawing the wire through such a rotary straightener by force applied beyond the straightener in the direction of travel of the wire tends to draw the wire into tight binding relation against the working faces of the tools 65 due to increased force necessary to pull the wire through the drawing die.

From the straightener 4 the wire passes between the power driven feed rolls 5 which are positively synchronized with the grippers 35 and 36 through the medium of sprockets 70 and 71 connected by a roller chain 72. The sprockets 70 and 71 are drivingly connected by suitable gears, not shown, and are mounted respectively on shafts 52 and 53. Since the rolls 5 are synchronized with respect to the speed of the wire, the instantaneous portion of the wire passing from the straightener 4 to the rolls 5 is not subjected to tension. The rolls 5 are provided only for driving the last portion of the length of a given coil of stock after the trailing end has passed beyond the grippers 35 and 36.

Figure 7:
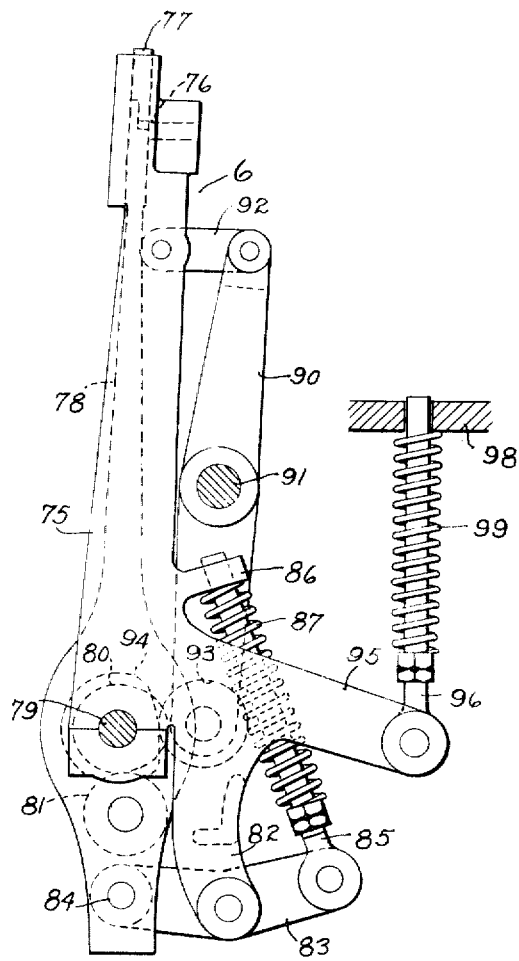
Figs. 7 and 8 are side and front elevations, respectively, of the flying shear mechanism.
Figure 8:
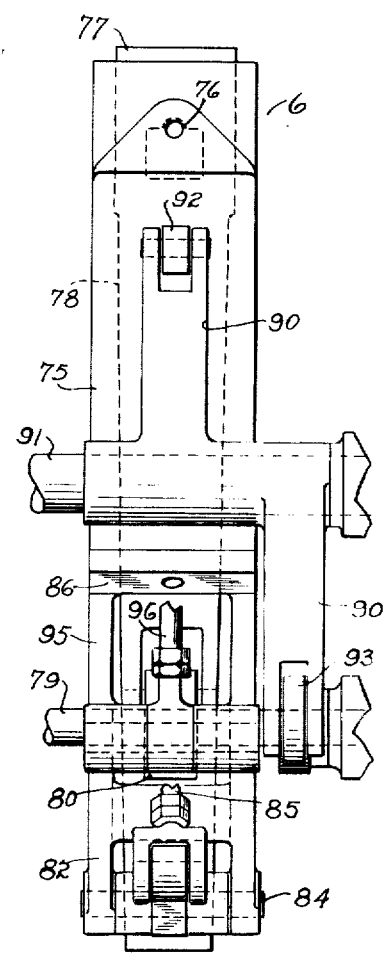

From the rolls 5, the drawn and straightened wire passes immediately into the flying shear 6 by which it is cut into blanks of the desired length. The flying shear 6 (Figs. 7 and 8) comprises an elongated housing 75 arranged for rocking movement about a fixed rocking axis and carrying at its outer end a stationary shearing block 76. The block 76 is so positioned on the housing as to move in a relatively flat arcuate path substantially tangential to or coincident with the path of the wire during rocking of the housing about its rocking axis. For shearing cooperation with the shear block 76 a shear block 77 is provided, the shear block 77 being mounted on and guided in the housing 75 for reciprocation therealong radially with respect to the rocking axis. For reciprocating the block 77, a reciprocating rod 78 is carried by the housing 75 and is operated to effect the shearing stroke during travel of the blocks with the housing along the path of the wire so that blanks may be severed from the wire during the continuous travel thereof. Since the flying shear must operate with high precision and at relatively high speeds, it is necessary that it be as light as possible and that the weight be distributed and arranged to reduce inertia forces to a minimum.

In order to mount the flying shear and operating mechanism for obtaining these results, the housing 75 is mounted for rocking movement on a pivot. In the form illustrated this pivot includes a cam shaft 79 on which is mounted in circumferentially fixed position a cam 80 which operates the rod 78. For effecting reciprocation of the rod 78 by the cam 80, a cam follower 81 is carried on the rod 78 and cooperates with the cam 80 at the opposite side of its axis from the shear block 77 so that the block 77 is drawn positively radially inwardly on its shearing stroke.

To constrain the cam follower 81 to operating engagement with the cam 80, the housing 75 is provided with a depending integral bracket portion 82 on which is pivotally mounted a rocker arm 83, one end of the arm being pivotally connected to the rod 78, as indicated at 84, and the opposite end being pivotally connected to an eye bolt 85. Operatively interposed between the eye bolt 85 and a suitable abutment 86 on the housing 75 is a coiled compression spring 87 which is operative to urge the rod 78, through the medium of the rocker arm 83, in a direction to hold the follower 81 firmly against the cam.

The cam 80 is configured and positioned with respect to the shaft 79 so as to operate the block 77 on the shearing stroke while the housing 75 is being moved with the traveling wire by the mechanism now to be described.

For rocking the housing 75 about the shaft 79 in the direction of travel of the wire, a main rocker arm 90 is pivotally mounted intermediate its ends on a suitable shaft 91 which is secured in fixed position on the frame of the apparatus, the rocker arm 90 being operatively connected near one end to the housing 75 by a link 92. For rocking the arm 90, a cam follower 93 is mounted on the other end of the arm and operatively engages a cam 94, the cam 94 being mounted on the shaft 79 in fixed position circumferentially thereof. The cams 80 and 94 operate in fixed relation with respect to each other. The main rocker arm 90 is positively driven by the cam 94 for driving the housing 75 in the direction of travel of the wire. For constraining the cam follower 93 to firm operative engagement with the cam 94 and also for returning the housing 75 in a direction opposite to the direction of travel of the wire, the housing 75 has a rigid operating arm 95 to which is connected an eye bolt 96. Operatively interposed between suitable abutments 97 on the eye bolt 96 and an abutment portion 98 of the frame of the apparatus is a coiled compression spring 99 which is compressed upon movement of the housing 75 in the direction of travel of the wire and thereupon becomes operative to return the housing toward starting position.

Even with the housing in returned position, however, the spring 99 is partially compressed so that, through the medium of the link 92 and main rocker 90, the cam follower 93 is urged firmly into engagement with the cam 94.

As mentioned above, it is desirable that the inertia forces be reduced to a minimum and for this purpose the cam followers and heavy operating parts of the flying shear are positioned as near by as possible to and in balanced relation about the rocking axis or shaft 79 and the weight of the arms 82 and 95 and the associated moving parts are positioned as near as may be in balanced relation to the weight of the arm 78 and shear block supporting portion of the housing 75. Thus the bulk of the moving parts is maintained with its center of inertia as closely as possible to the rocking axis of the flying shear.

It is necessary that the flying shear 6 be operable to sever blanks of different lengths from the traveling wire and for initiating the operation of the flying shear at the intervals desired for providing a particular length of blank, the adjustable gauging device 7 is provided.

The adjustable gauging device 7 includes an instantaneous, one revolution clutch 100, of a well-known type, which is mounted on the shaft 79. The clutch has a continuously rotating part, not shown, which is continuously driven by a suitable pulley 101, the pulley, in turn, being driven by a suitable motor 102 through a belt 103. The clutch 100 has a rotatable housing 104 having a suitable arresting abutment 105 and is operative to rotate the shaft 79 when the housing 104 is released for rotation and to become drivingly disconnected from the shaft 79 when the rotation of the housing 104 is arrested.

Thus by control of the rotatble housing 104 of the clutch 100, the operation of the flying shear can be controlled. For arresting rotation of the clutch housing 104 and thereby rendering the clutch inoperative, a latching arm 106 is rockably mounted on the shaft 91 for rocking movement into respective positions to engage and disengage the arresting abutment 105.

To effect positive movement of the arm 106 into engagement with the abutment 105, an arm 107 is provided, the arm 107 being operatively rigid with the arm 106 and carrying at one end a cam follower 108 which operatively engages a cam 109 secured in fixed circumferential position on the shaft 79.

For urging the arm 107 in a clockwise direction which would normally dispose the cam follower 108 against the cam 109, an arm 110 is rigidly secured to the arm 107 and, through the medium of an eye bolt 111, is operatively connected to a compression spring 112. The cam 109 is provided with a peak portion of maximum eccentricity with respect to the shaft 79 and which, when in engagement with the cam follower 108, moves the arm 107 to dispose the arm 106 in locking relation with respect to the arresting abutment 105.

Since the clutch is to be operated intermittently only and then only for a single revolution, it is necessary to latch the arm 107 at the instant that the peak of the cam 109 passes the follower 108 and thus retain the arm 106 in latching relation to the abutment 105.

To partially relieve the abutment 105 and the latching arm 106 from sudden inertia shocks at the instant of arresting the clutch housing 104 and the cam shaft 79, a brake 79b is provided on the shaft 79. The brake 79b exerts a constant torque resistance or drag on the shaft 79 during the rotation thereof so that upon release of the clutch 100 from driving engagement with the shaft 79, the speed of rotation of the shaft 79 and its associated parts is immediately greatly reduced by the brake and may be stopped without appreciable shock by the abutment 105, and thereupon, will be held in position until re-engagement of the clutch.

Figure 6:
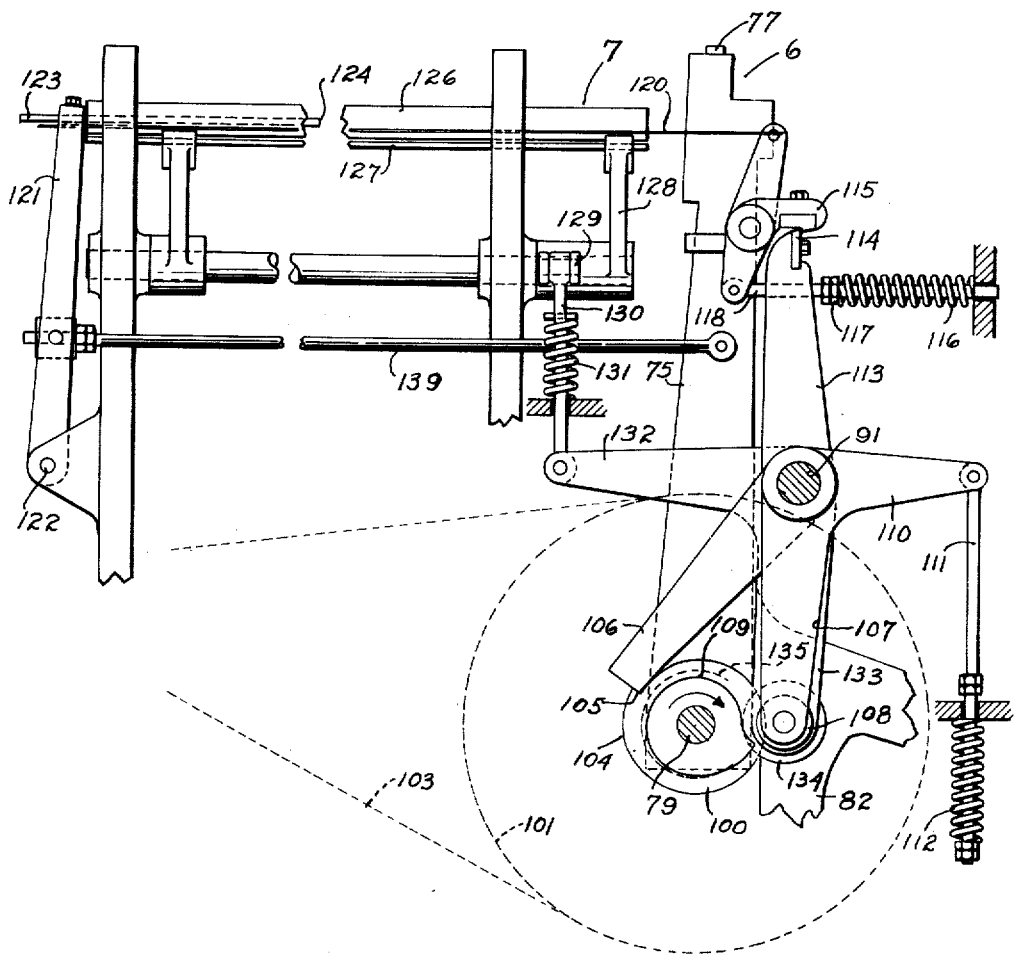
Fig. 6 is an enlarged and fragmentary side elevation of the apparatus showing the clutch, trigger, and stock gauging mechanism for initiating operation of the flying shear mechanism.
Figure 9:
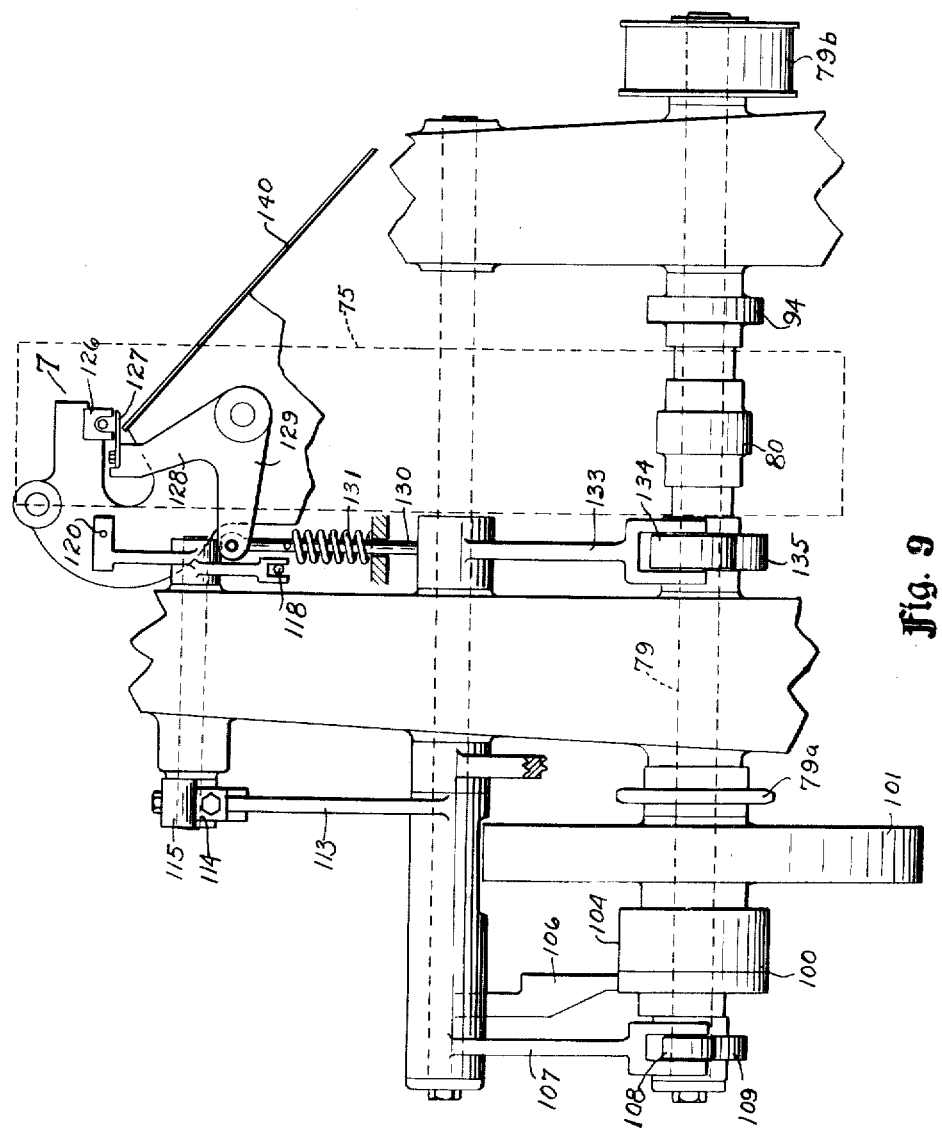
Fig. 9 is a front elevation of the mechanism shown in Fig. 6.

To latch the arm 107 so that the arm 106 is in latching relation to the abutment 105, the arm 107 is provided with an extension 113 which carries a latching shoulder 114. A cooperating latch element 115 is pivotally mounted on the frame of the apparatus, as illustrated in Figs. 6 and 9, in position for cooperation with the shoulder 114. The latch element 115 is urged into latching position by a compression spring 116 which is interposed between an operating abutment 117 on an eye bolt 118 connected to the latch element 115 and an abutment portion on the frame of the apparatus. Thus by releasing the latch element 115, the clutch housing 104 becomes released and the clutch 100 becomes operative to rotate the shaft 79 for effecting one complete operation of the flying shear. During this revolution of the clutch housing 104 the arms 106 and 107 are moved by the cam 109 in a manner such that the arm 106 is positioned to re-engage the abutment 105 and the extension 113 is positioned to become re-engaged by the latch element 115. This action places the arm 106 in engagement with the shoulder 105 thereby arresting further operation of the flying shear. Thus the flying shear may be controlled by controlling the latch element 115.

To render the operation of the flying shear automatic, a tension wire 120 connects the latch element 115 to a rocking lever 121 which is mounted on a suitable rock shaft 122 on the frame of the apparatus. Carried on the rocking lever 121 is a target or gauging element 123 which is adjustable relative thereto along the path of travel of the wire and which has, at its leading end, an abutment surface 124 disposed directly in the path of the oncoming wire. The element 123 is pivoted to the lever 121 to permit the element to reciprocate along a substantially linear path.

Upon engagement of the traveling wire with the abutment 124, the lever 121 is rocked about its pivot in the direction of travel of the wire to pull the wire 120 and thereby trip the latch element 115 to initiate the shearing operation.

For guiding the traveling wire from the flying shear into engagement with the abutment 124, a suitable inverted trough 126 is provided, the trough extending longitudinally of the path of travel of the wire. The trough 126 is normally closed at the bottom by a sliding plate 127. To permit rapid removal of the severed blank from the path of the relatively oncoming wire, the plate 127 is supported on a rocker arm 128 which is operated by a bell crank 129, the bell crank, in turn, being operated through the medium of an eye bolt 130 and a compression spring 131 to hold the plate 127 in closed position with respect to the trough 126. For operating the arm 128 to remove the plate 127 from beneath the trough 126, the eye bolt 130 is connected to an operating arm 132. The arm 132 is connected in fixed relation to an arm 133 which carries a cam follower 134, this cam follower engaging the cam 135 on the shaft 79. The cam 135 is arranged with respect to the arms 132 and 133 so as to depress the arm 132 and thereby slide the plate 127 to open position at the instant after the completion of the movement of the flying shear in the direction of the traveling wire. In this manner the rod is guided during the shearing operation and into proper engagement with the abutment 124 and the severed portion is released at a proper time so that it is dropped out of the path of the oncoming wire stock.

In order to facilitate removal of the sheared blanks, the abutment 124 must be withdrawn rapidly from the end of the oncoming wire after initiation of the operation of the flying shear 6. To effect this removal, a link 139 is connected to the housing 75 of the shear and is provided with an abutment engaging the lever 121 for moving the lever 121 only in the direction of travel of the wire. Since the radius of rotation of the point of connection of the link 139 with the housing 75 is greater than the radius of rotation of the point of connection of the link 139 with the lever 121, the lever 121 is caused to move so that the abutment 124 moves more rapidly than the oncoming wire. The lever 121 is returned to starting position by the link 139 and shear housing 75.

For driving the flying shear 6 and the continuous feeding mechanism 3 in proper relation to effect synchronous travel of the grippers 35 and 36 and shear blocks 76 and 77 in the direction of travel of the wire, the main operating shafts 52 and 79 carry sprockets 52a and 79a respectively which are positively connected by a suitable chain drive 141, as shown, or by suitable gears, if desired.

The blanks 8, as they are sheared from the stock, are released from the trough 126 and drop to a suitable chute 140 leading to a suitable hopper or rack.

Having thus described our invention, what we claim is:

1. The combination with a drawing die and means to draw relatively heavy hot rolled rod stock continuously through said die to reduce the stock, of rotary straightening means receiving and straightening the travelling drawn stock promptly after the stock leaves the die and during the continued travel of the stock.

2. The combination with a drawing die for drawing rod stock, and a straightener, of means interposed between the die and the straightener for continuously pulling stock material through the die to reduce the stock and immediately pushing the drawn stock through the straightener.

3. The combination with driving means for driving relatively heavy rod stock material continuously along a given path of travel, of a drawing die in cooperation with the stock material closely in advance of said driving means in the direction of travel of the material for reducing the bar stock, and a straightener in cooperation with the formed wire closely behind said driving means in the direction of travel.

4. In an apparatus for the purposes described, a drawing die, means for drawing hot rolled stock through said die to reduce the stock and for moving the drawn stock continuously along a given path of travel, a straightener in cooperation with the traveling stock beyond said die in the direction of travel, a flying shear in cooperation with the traveling stock beyond the straightener in the direction of travel and operative for shearing off lengths of the reduced stock during travel thereof, driving means to operate the shear and gauging means operatively connected to the driving means for controlling the operation thereof and of the shear to shear off predetermined lengths of the stock.

5. In an apparatus for the purposes described, a drawing die, means for drawing stock through said die to reduce the stock and for moving the drawn stock continuously along a given path of travel, a straightener in cooperation with the drawn stock beyond said die in the direction of travel, a flying shear in cooperation with the traveling stock beyond the straightener in the direction of travel for shearing off lengths of the stock during travel thereof, driving means to operate the shear, and gauging means operatively connected to the driving means and operatively engaged by the traveling stock and operated by the traveling stock to initiate cooperation of the driving means and shear in predetermined relation to the distance of travel of the stock material.

6. In an apparatus for shearing blanks from continuously traveling rod stock, means to drive the stock continuously along a given path of travel, a flying shear mounted for swinging movement along said path of travel about an axis extending transversely of said path and operable for receiving the stock and for severing portions thereof during travel of the stock, means for actuating the shear to sever the stock, means for swinging the shear with the stock, a one revolution clutch operating both said means during revolution of the clutch, latch means operative in a predetermined position for constraining the clutch from rotation, yieldable means urging the latch means from said position, trigger means cooperable with the latch means for holding the latch means in said predetermined position against the force of the yieldable means and for releasing the same when the trigger means is moved to a releasing position, said trigger means being movable to releasing position by the traveling stock, means operative to restore the shear and trigger means to their original positions upon completion of the shearing operation and resetting means operated by the clutch for restoring the latch means to said predetermined position.

7. In an apparatus for the purposes described, a drawing die, means for drawing stock through said die to form drawn stock thereof and for moving the drawn stock continuously along a given path of travel, a straightener in cooperation with the drawn stock beyond said means in the direction of travel, a flying shear in cooperation with the traveling stock beyond the straightener in the direction of travel for shearing off lengths of the stock during travel thereof, auxiliary feeding means in driving cooperation with the stock between the straightener and flying shear, and gauging means operatively connected to the shear for controlling the operation thereof to shear off predetermined lengths of the stock.

8. In an apparatus for shearing blanks from continuously traveling stock material, means to drive the stock continuously along a given path of travel, a flying shear mounted for swinging movement along said path of travel and operable for receiving the stock and for severing portions thereof during travel of the stock, rotatable driving means for actuating the shear to sever the stock and for swinging the shear synchronously with the stock, a one revolution clutch operating said means during the revolution of the clutch, said clutch having a restraining abutment rotatable therewith, a lever engageable with said abutment for constraining the clutch from rotation, resilient means yieldably urging the lever out of engagement with the abutment, means operated by the clutch during rotation of the clutch for setting the lever into the path of rotation of the abutment prior to completion of a revolution of the clutch, trigger means for latching the lever in the set position in the path of the abutment, and means operatively connected to the trigger means and engageable by the traveling stock for releasing the trigger means from the lever.

9. In an apparatus for shearing blanks from continuously traveling bar stock, means to drive the stock continuously along a given path of travel, a flying shear movable along said path of travel and operable for receiving the stock for severing portions thereof during travel of the stock, said shear comprising a rigid housing, means connected to the housing and supporting the housing for rocking movement about a shaft extending transversely relative to the path of travel of the stock, shear blocks carried by the housing and movable relative to each other for shearing the stock, means carried by the housing and operable for effecting said relative movement of said shear blocks, driving means operated by said shaft for rocking said housing in the direction of travel of the stock and for concurrently moving said blocks with respect to each other, and means for returning said housing and blocks to starting position.

10. In an apparatus for shearing blanks from continuously traveling bar stock, means to drive the stock continuously along a given path of travel, a flying shear movable along said path of travel and operable for receiving the stock for severing portions thereof during travel of the stock, said shear comprising a rigid housing, a shaft extending transversely with respect to the path of travel of the stock and being spaced from said path and supporting said housing for swinging movement to and fro along the path of travel of the stock, shear blocks carried by the housing remote from said shaft and disposed in the path of travel of the stock, means operatively connected at one end to said shear blocks for operating said shear blocks to effect the shearing operation and extending along said housing and terminating at the other end close to the rocking axis, cam means cooperable with said last mentioned means and rotatable about an axis coaxial with said rocking axis, means carried by the housing and driven for moving the housing in the direction of travel of the stock, means for returning the housing to starting position, and all of said means being positioned closely adjacent the rocking axis of the housing, whereby inertia of the moving parts is reduced.

11. In an apparatus for shearing blanks from continuously traveling bar stock, means to drive the stock continuously along a given path of travel, a flying shear movable along said path of travel and operable for receiving the stock for severing portions thereof during travel of the stock, said shear comprising an elongated rigid housing mounted at one end on a shaft for rocking movement about the axis thereof, the rocking axis extending transversely with respect to the path of the stock, a fixed shear block carried at the other end of the housing, a reciprocable shear block cooperable with the first shear block and reciprocable longitudinally of the housing, an operating rod connected to the reciprocating shear block and guided by the housing and extending longitudinally thereof, a rotatable cam on said shaft, means operatively connecting said rod and cam for reciprocating said shear block, means to rock the housing about said shaft for effecting movement of said shear blocks bodily along the path of travel of the stock in the direction of travel thereof, and means for rocking the housing to return said blocks bodily to starting position along the path of travel of the stock.

12. In an apparatus for shearing blanks from continuously traveling bar stock, means to drive the stock continuously along a given path of travel, a flying shear mounted for swinging movement substantially along said path of travel and operable for receiving the stock for severing portions thereof during travel of the stock, means for actuating the shear to sever the stock, driving means operable for swinging the shear with the stock when said means is operatively connected to the shear, means to return the shear opposite to the direction of travel of the stock when the driving means is operatively disconnected from the shear, a control means for effecting substantially instantaneous operative connection between the shear and driving means when the control means is active and to effect a delayed disconnection of the shear and driving means when the control means is idle, a trigger mechanism normally holding the control means in idle condition, and being releasable therefrom, and means engageable by the traveling stock for releasing the trigger mechanism from the control means, means for rendering the control means active substantially instantaneously upon release thereof, and means operated by the control means for restoring the trigger mechanism to hold the control means in idle condition.

13. In an apparatus for shearing blanks from continuously traveling stock, means to drive the stock continuously along a given path of travel, a flying shear movable along said path of travel with the stock and operable for severing portions from the stock during travel therewith, driving means for driving said shear in the direction of travel of the stock and for concurrently operating the same for effecting the shearing operation, control means for operatively disconnecting the driving means and shear, means for returning the shear to starting position, when the shear is disconnected, gauging means for operating the control means into disconnecting position and being movable therefor by the oncoming stock in the direction of travel of the stock to a predetermined position, means for reconnecting the driving means and shear when the gauging means is moved to said position by the stock, and means operatively connecting the shear and gauging means for accelerating the movement of the gauging means in said direction beyond said position when the shear moves in the direction of the stock, whereby the gauging means is moved to spaced relation to the sheared stock to facilitate free disposition of the sheared stock.

14. In an apparatus for effecting continuous travel of bar stock material along a given path, a pair of arms, each arm being mounted for rocking movement about an axis extending transversely of and spaced from the path of the stock, relatively movable gripping elements carried by each arm and spaced from the rocking axis thereof and driven by the associated arm in opposite directions substantially lineally along said path as the arm rocks, means cooperable with the elements of each arm for clamping the same into firm gripping relation to the stock during rocking movement of the associate arm in the direction of travel of the stock and for releasing the same upon rocking movement of the arm in the opposite direction, said arms being spaced apart along the path of travel, and means for driving said arms successively and in an overlapping timed relation to each other to effect driving engagement of the gripping elements of one arm with the stock and driving of the stock thereby prior to discontinuing the driving engagement of the gripping elements of the other arm with the stock and the releasing of the stock by the elements of the other arm.

15. In an apparatus for effecting uniform continuous travel of bar stock material along a given path, a pair of arms, each arm being mounted for rocking movement about an axis extending transversely of and spaced from the path of the stock, relative movable gripping elements carried by each arm and spaced from the associated rocking axis thereof and being driven by the associated arm in opposite directions substantially lineally along said path as the arm rocks, means cooperable with the elements for clamping the same into firm gripping relation to the stock during rocking movement of the arm in the direction of travel of the stock and for releasing the same upon rocking movement of the arm in the opposite direction, said arms being spaced apart along the path of travel, means for rocking said arms successively in an overlapping timed relation to each other to effect driving engagement of the gripping elements of one arm with the stock prior to release of the elements of the other arm, said last named means being operative to rock the associated arms at continuously changing speeds during rocking movement thereof in the direction of travel of the stock for effecting uniform lineal motion of the elements associated therewith.

16. In an apparatus for effecting travel of bar stock material along a given path comprising an arm mounted for rocking movement about an axis extending transversely of and spaced from the path of the stock, a set of relative movable gripping elements moved in opposite directions by the arm and spaced thereby from the rocking axis, means mounting said set of elements on the arm for concurrent limited movement radially of the axis of the arm and for rocking movement relative to the arm about an axis parallel to the rocking axis, whereby the set of elements may move substantially lineally along said path as the arm rocks, means cooperable with the elements for clamping the same into firm gripping relation to the stock during rocking movement of the arm in the direction of travel of the stock and for releasing the same upon rocking movement of the arm in the opposite direction, means for rocking said arm in the direction of travel to effect driving engagement of the gripping elements with the stock, and means to return the arm in the opposite direction.

17. In a continuous stock drawing machine, means for producing travel of the wire along a given path comprising a power driven arm mounted for limited rocking movement about an axis extending transversely of the path of travel of wire and spaced therefrom, said arm having portions spaced apart from each other and at opposite sides of the path of travel of the stock, relatively movable wire gripping elements mounted between said portion and mounted in each portion for limited radial sliding and rocking movement relative to the arms, means constraining the elements to move in a path coincident with the path of travel of the wire, the axis of the rocking movement of the gripping elements relative to the arms at all times intersecting the axis of travel of the wire, whereby the gripping elements exert only a lineal drawing force on the wire.

18. In a machine for drawing long metal rod stock, a drawing die, a plurality of alternately operating gripping devices positioned beyond the die in the direction of travel of the stock and positively gripping the stock beyond the die and pulling it through the die at a uniform rate of speed, said devices comprising a pair of arms, each arm being mounted for rocking movement about an axis extending transversely of and spaced from the path of travel of the stock, relatively movable gripping elements carried by each arm and spaced from the rocking axis thereof and driven by the associated arm in opposite directions substantially lineally along said path as the associated arm rocks, means cooperable with the elements of each arm for clamping the same into firm gripping relation to the stock during rocking movement of the associated arm in the direction of travel of the stock and for releasing the same upon rocking movement of the arm in opposite direction, said arms being spaced apart along the path of travel and each arm being connected to its associated gripping elements at each side of the path of travel, and means for driving said arms successively in an overlapping time relation to each other to effect driving engagement of the gripping elements of one arm with the stock and driving of the stock thereby prior to releasing of the stock by the elements of the other arm.

WILLIAM W. CRILEY.
FREDERICK W. GAINES, 3RD.

CERTIFICATE OF CORRECTION.

Patent No. 2,126,453.            August 9, 1938.

WILLIAM W. CRILEY, ET AL.

It is hereby certified that error appears in the printed specification of the above numbered patent requiring correction as follows: Page 6, first column, line 56, claim 3, for the words "formed wire" read drawn stock; page 7, second column, line 70, claim 14, for the word "associate" read associated; and that the said Letters Patent should be read with this correction therein that the same may conform to the record of the case in the Patent Office.

Signed and sealed this 1st day of November, A. D. 1938.

Henry Van Arsdale (Seal)            Acting Commissioner of Patents.

relation to each other to effect driving engagement of the gripping elements of one arm with the stock and driving of the stock thereby prior to discontinuing the driving engagement of the gripping elements of the other arm with the stock and the releasing of the stock by the elements of the other arm.

15. In an apparatus for effecting uniform continuous travel of bar stock material along a given path, a pair of arms, each arm being mounted for rocking movement about an axis extending transversely of and spaced from the path of the stock, relative movable gripping elements carried by each arm and spaced from the associated rocking axis thereof and being driven by the associated arm in opposite directions substantially lineally along said path as the arm rocks, means cooperable with the elements for clamping the same into firm gripping relation to the stock during rocking movement of the arm in the direction of travel of the stock and for releasing the same upon rocking movement of the arm in the opposite direction, said arms being spaced apart along the path of travel, means for rocking said arms successively in an overlapping timed relation to each other to effect driving engagement of the gripping elements of one arm with the stock prior to release of the elements of the other arm, said last named means being operative to rock the associated arms at continuously changing speeds during rocking movement thereof in the direction of travel of the stock for effecting uniform lineal motion of the elements associated therewith.

16. In an apparatus for effecting travel of bar stock material along a given path comprising an arm mounted for rocking movement about an axis extending transversely of and spaced from the path of the stock, a set of relative movable gripping elements moved in opposite directions by the arm and spaced thereby from the rocking axis, means mounting said set of elements on the arm for concurrent limited movement radially of the axis of the arm and for rocking movement relative to the arm about an axis parallel to the rocking axis, whereby the set of elements may move substantially lineally along said path as the arm rocks, means cooperable with the elements for clamping the same into firm gripping relation to the stock during rocking movement of the arm in the direction of travel of the stock and for releasing the same upon rocking movement of the arm in the opposite direction, means for rocking said arm in the direction of travel to effect driving engagement of the gripping elements with the stock, and means to return the arm in the opposite direction.

17. In a continuous stock drawing machine, means for producing travel of the wire along a given path comprising a power driven arm mounted for limited rocking movement about an axis extending transversely of the path of travel of wire and spaced therefrom, said arm having portions spaced apart from each other and at opposite sides of the path of travel of the stock, relatively movable wire gripping elements mounted between said portion and mounted in each portion for limited radial sliding and rocking movement relative to the arms, means constraining the elements to move in a path coincident with the path of travel of the wire, the axis of the rocking movement of the gripping elements relative to the arms at all times intersecting the axis of travel of the wire, whereby the gripping elements exert only a lineal drawing force on the wire.

18. In a machine for drawing long metal rod stock, a drawing die, a plurality of alternately operating gripping devices positioned beyond the die in the direction of travel of the stock and positively gripping the stock beyond the die and pulling it through the die at a uniform rate of speed, said devices comprising a pair of arms, each arm being mounted for rocking movement about an axis extending transversely of and spaced from the path of travel of the stock, relatively movable gripping elements carried by each arm and spaced from the rocking axis thereof and driven by the associated arm in opposite directions substantially lineally along said path as the associated arm rocks, means cooperable with the elements of each arm for clamping the same into firm gripping relation to the stock during rocking movement of the associated arm in the direction of travel of the stock and for releasing the same upon rocking movement of the arm in opposite direction, said arms being spaced apart along the path of travel and each arm being connected to its associated gripping elements at each side of the path of travel, and means for driving said arms successively in an overlapping time relation to each other to effect driving engagement of the gripping elements of one arm with the stock and driving of the stock thereby prior to releasing of the stock by the elements of the other arm.

WILLIAM W. CRILEY.
FREDERICK W. GAINES, 3RD.

CERTIFICATE OF CORRECTION.

Patent No. 2,126,453. August 9, 1938.

WILLIAM W. CRILEY, ET AL.

It is hereby certified that error appears in the printed specification of the above numbered patent requiring correction as follows: Page 6, first column, line 56, claim 3, for the words "formed wire" read drawn stock; page 7, second column, line 70, claim 14, for the word "associate" read associated; and that the said Letters Patent should be read with this correction therein that the same may conform to the record of the case in the Patent Office.

Signed and sealed this 1st day of November, A. D. 1938.

Henry Van Arsdale (Seal) Acting Commissioner of Patents.